US011144642B2

(12) United States Patent
Gu et al.

(10) Patent No.: US 11,144,642 B2
(45) Date of Patent: \*Oct. 12, 2021

(54) DEACTIVATING EVASIVE MALWARE

(71) Applicant: INTERNATIONAL BUSINESS MACHINES CORPORATION, Armonk, NY (US)

(72) Inventors: Zhongshu Gu, Ridgewood, NJ (US); Heqing Huang, Mahwah, NJ (US); Jiyong Jang, White Plains, NY (US); Dhilung Hang Kirat, White Plains, NY (US); Xiaokui Shu, Ossining, NY (US); Marc P. Stoecklin, White Plains, NY (US); Jialong Zhang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 38 days.

This patent is subject to a terminal disclaimer.

(21) Appl. No.: 16/694,185

(22) Filed: Nov. 25, 2019

(65) Prior Publication Data

US 2020/0089879 A1    Mar. 19, 2020

Related U.S. Application Data

(63) Continuation of application No. 15/726,660, filed on Oct. 6, 2017, now Pat. No. 10,546,128.

(51) Int. Cl.
*G06F 21/00*    (2013.01)
*G06F 21/56*    (2013.01)
(Continued)

(52) U.S. Cl.
CPC ............... *G06F 21/56* (2013.01); *G06F 8/61* (2013.01); *G06F 21/566* (2013.01); *G06F 16/22* (2019.01);
(Continued)

(58) Field of Classification Search
CPC ........ G06F 21/56; G06F 21/566; G06F 21/53; G06F 2221/034; G06F 2221/033;
(Continued)

(56) References Cited

U.S. PATENT DOCUMENTS 8,918,878 B2    12/2014 Niemelae
9,984,231 B2 *   5/2018 Salajegheh ........... G06F 21/566
(Continued)

OTHER PUBLICATIONS

Balzoretti "Efficient Detection of Split Personalities in Malware". Network and IT Security Conference: NDSS 2010. <https://www.isoc.org/isoc/conferences/ndss/10/proceedings.shtml>. Seventeen pages.

(Continued)

*Primary Examiner* — Yogesh Paliwal
(74) *Attorney, Agent, or Firm* — Edward P. Li

(57) ABSTRACT

A computer-implemented method, a computer program product, and a computer system. The computer system installs and configures a virtual imitating resource in the computer system, wherein the virtual imitating resource imitates a set of resources in the computer system. Installing and configuring the virtual imitating resource includes modifying respective values of an installed version of the virtual imitating resource for an environment of the computer system, determining whether the virtual imitating resource is a static imitating resource or a dynamic imitating resource, and comparing a call graph of the evasive malware with patterns of dynamic imitating resources on a database. The computer system returns a response from an appropriate element of the virtual imitating resource, in response to a call from the evasive malware to a real computing resource, return, by the computer system.

20 Claims, 9 Drawing Sheets

(51) Int. Cl.
*G06F 8/61* (2018.01)
*G06F 16/22* (2019.01)
*G06F 21/53* (2013.01)

(52) U.S. Cl.
CPC ........ *G06F 21/53* (2013.01); *G06F 2221/034* (2013.01)

(58) Field of Classification Search
CPC ...... G06F 8/61; G06F 17/30312; G06F 16/22; H04L 63/1433
See application file for complete search history.

(56) References Cited

U.S. PATENT DOCUMENTS

| | | | |
|---|---|---|---|
| 2008/0016339 A1 | 1/2008 | Jayant | |
| 2016/0094564 A1* | 3/2016 | Mohandas | ............ H04L 63/145 726/24 |
| 2016/0212154 A1* | 7/2016 | Bobritsky | ............... G06F 21/56 |
| 2019/0108339 A1 | 4/2019 | Gu | |

OTHER PUBLICATIONS

Blackthorne et al. "Fingerprinting Antivirus Emulators Through Black-Box Testing" 10th USENIX Workshop on Offensive Technologies. WOOT '16. Aug. 8-9, 2016. Austin Texas.

Chen et al. Towards an Understanding of Anti-virtualization and Anti-debugging Behavior in Modern Malware. International Conference on Dependable Systems and Networks. Anchorage Alaska. June 24-27. 2008. Ten pages.

Dinaburg et al. "Ether: Malware Analysis via Hardware Virtualization Extensions" CCS'08, Oct. 27-31, 2008, Alexandria, Virginia, USA. pp. 51-62.

Keragala, D. "Detecting malware and sandbox evasion techniques." SANS Institute InfoSec Reading Room (2016).

Kirat et al. "MalGene: Automatic Extraction of Malware Analysis Evasion Signature" CCS'15, Oct. 12-16, 2015, Denver, Colorado, USA. Twelve pages.

Kirat et al. "BareCloud: Bare-metal Analysis-based Evasive Malware Detection" Proceedings of the 23rd USENIX Security Symposium. Aug. 20-22, 2014 San Diego, CA.

Lindorfer et al: "Detecting Environment-Sensitive Malware" RAID 2011, LNCS 6961, pp. 338-357, 2011. c Springer-Verlag Berlin Heidelberg 2011.

List of IBM Patents or Patent Applications Treated as Related. Filed Nov. 25, 2019. 2 pages.

Pek et al. "nEther: In-guest Detection of Out-of-the-guest Malware Analyzers". EUROSEC '11, Apr. 10, 2011, Salzburg, Austria. Six pages.

Svetsov "Three interesting changes in malware activity over the past year". Mar. 31, 2016. Two pages. <https://www.lastline.com/labsblog/three-interesting-changes-in-malware-activity-over-the-past-year>.

Xu et al. "AUTOVAC: Towards Automatically Extracting System Resource Constraints and Generating Vaccines for Malware Immunization" 2013 IEEE 33rd International Conference on Distributed Computing Systems. Twelve pages.

Xu et al. "GOLDENEYE: Efficiently and Effectively Unveiling Malware's Targeted Environment". RAID 2014, LNCS 8688, pp. 22-45, 2014. c Springer International Publishing Switzerland 2014.

Yokoyama et al. "SandPrint: Fingerprinting Malware Sandboxes to Provide Intelligence for Sandbox Evasion". Springer International Publishing Switzerland 2016. Twenty-three pages.

* cited by examiner

DEACTIVATING EVASIVE MALWARE

BACKGROUND

The present invention relates generally to computer security, and more particularly to deactivating evasive malware.

Security experts rely on analysis environments (such as malware analysis sandboxes) to uncover malware behaviors and generate corresponding signatures for future detection. However, most emerging malware is equipped with evasive logic to determine current execution environments. Once malware finds itself running within an analysis environment, the malware may choose not to execute and expose its malicious logic. Based on a recent study, over 80% of malware exhibits evasive behaviors in the second half of 2015. There is extensive prior work on detecting user-level sandboxes, system-level virtual machines, and hardware-level debugging extensions. Advanced evasive malware can fingerprint these analysis environments and cloak its malicious behaviors. Without the lab analysis results (i.e., malware signatures), it will be extremely difficult to detect such malware running on physical end hosts.

SUMMARY

In one aspect, a computer-implemented method for protecting a host from evasive malware is provided. The computer-implemented method includes installing and configuring, by a computer system, a virtual imitating resource in the computer system, wherein the virtual imitating resource imitates a set of resources in the computer system. Installing and configuring the virtual imitating resource includes modifying respective values of an installed version of the virtual imitating resource for an environment of the computer system and determining whether the virtual imitating resource is a static imitating resource or a dynamic imitating resource. Installing and configuring the virtual imitating resource further includes, in response to determining that the virtual imitating resource is the dynamic imitating resource, comparing a call graph of the evasive malware with patterns of dynamic imitating resources on a database. The computer-implemented method further includes returning, by the computer system, a response from an appropriate element of the virtual imitating resource, in response to a call from the evasive malware to a real computing resource.

In another aspect, a computer program product for protecting a host from evasive malware is provided. The computer program product comprising one or more computer-readable tangible storage devices and program instructions stored on at least one of the one or more computer-readable tangible storage devices. The program instructions are executable to: install and configure, by a computer system, a virtual imitating resource in the computer system, wherein the virtual imitating resource imitating a set of resources in the computer system; return, by the computer system, a response from an appropriate element of the virtual imitating resource, in response to a call from the evasive malware to a real computing resource. Installing and configuring the virtual imitating resource includes: modifying respective values of an installed version of the virtual imitating resource for an environment of the computer system; determining whether the virtual imitating resource is a static imitating resource or a dynamic imitating resource; and comparing a call graph of the evasive malware with patterns of dynamic imitating resources on a database, in response to determining that the virtual imitating resource is the dynamic imitating resource.

In yet another aspect, a computer system for protecting a host from evasive malware is provided. The computer system comprises one or more processors, one or more computer readable tangible storage devices, and program instructions stored on at least one of the one or more computer readable tangible storage devices for execution by at least one of the one or more processors. The program instructions are executable to install and configure, by a computer system, a virtual imitating resource in the computer system, wherein the virtual imitating resource imitating a set of resources in the computer system. Installing and configuring the virtual imitating resource includes modifying respective values of an installed version of the virtual imitating resource for an environment of the computer system and determining whether the virtual imitating resource is a static imitating resource or a dynamic imitating resource. Installing and configuring the virtual imitating resource further includes, in response to determining that the virtual imitating resource is the dynamic imitating resource, comparing a call graph of the evasive malware with patterns of dynamic imitating resources on a database. The program instructions are further executable to return, by the computer system, a response from an appropriate element of the virtual imitating resource, in response to a call from the evasive malware to a real computing resource.

DETAILED DESCRIPTION

Figure 1:
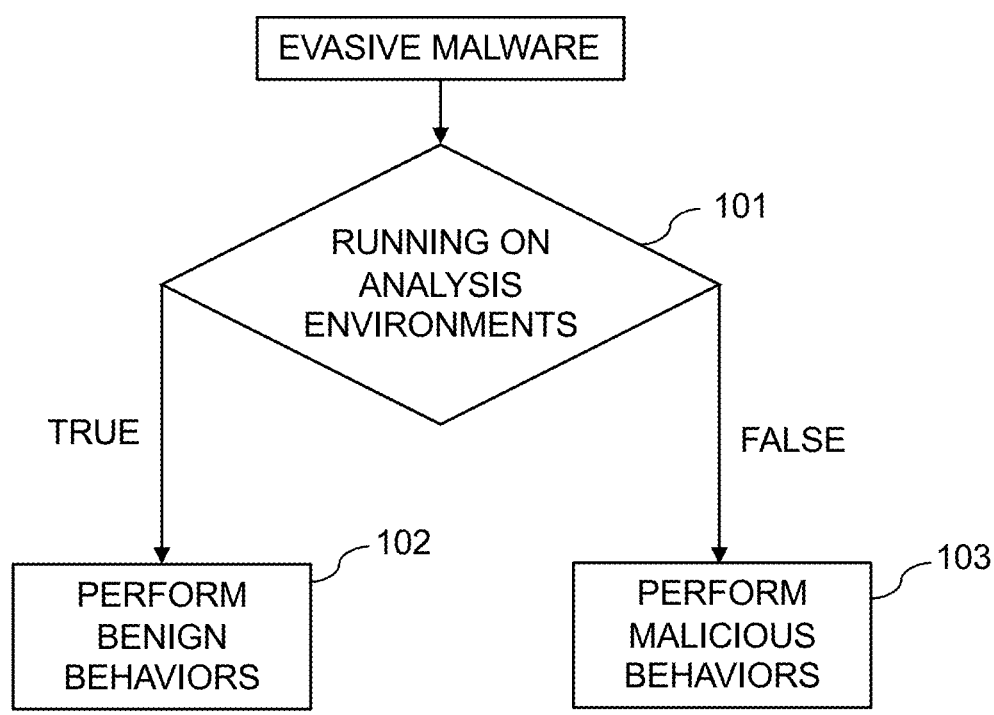
FIG. 1 is a diagram illustrating an abstract model of evasive malware.

FIG. 1 is a diagram illustrating an abstract model of evasive malware. Before evasive malware executes its malicious behaviors, the evasive malware checks whether it is running on analysis environments (as shown by block 101 in FIG. 1). In response to determining that the evasive malware is running on analysis environments (TRUE path), the evasive malware performs its benign behaviors (as shown by block 102 in FIG. 1). In response to determining that the evasive malware is not running on analysis environments (FALSE path), the evasive malware performs its malicious behaviors (as shown by block 103 in FIG. 1). The present invention uses the characteristic of the evasive malware to trick the evasive malware such that the evasive malware always executes the TRUE path shown in FIG. 1.

Embodiments of the present invention leverages the evasive nature of malware to protect computer systems from infection. Embodiments of the present invention disclose an approach to deactivating such malware on physical hosts (computer devices). This approach takes advantage of the evasive nature of malware, which is different from a traditional approach in which developers try to improve sandbox techniques for malware analysis to extract more malware behaviors. As a result of applying the approach, malware will stop executing its malicious behaviors on physical hosts. This approach can be deployed in physical hosts directly to provide a new way for system protection against evasive malware. The approach of the present invention is similar to using a scarecrow in open field to discourage birds from feeding on growing crops. Embodiments of the present invention disclose a method of place characteristics and features in a computer system such that characteristics and features deceive malware into inferring a running environment is an analysis environment and thereby will trigger the malware to disable itself.

Embodiments of the present invention discloses a method of inducing analysis environment related resources which are usually not used by benign software. In the method, counterfeit or imitating resources related to analysis environment fingerprinting are provided. The quantity of the resources is limited but they can be used across malware families.

Embodiments of the present invention disclose a multi-layer system to deceive evasive malware into believing that a physical machine it is running on is an analysis environment, thus the malware will not conduct malicious activities to avoid being analyzed. However, it is not necessary for benign software to show different behaviors on the analysis environment and the physical machine.

Major contributions of the present invention are as follows. (1) The approach of the present invention deactivates evasive malware that cannot be analyzed by the state-of-the-art analysis engines, so that the approach of the present invention is complementary to existing analysis engines. (2) The approach of the present invention proactively stops malware before malware exposing malicious behaviors. (3) The approach of the present invention exploits evasive techniques to defend against malware. Since the evasive techniques are limited across different malware families, the approach of the present invention can defend against previously unknown malware.

Figure 2:
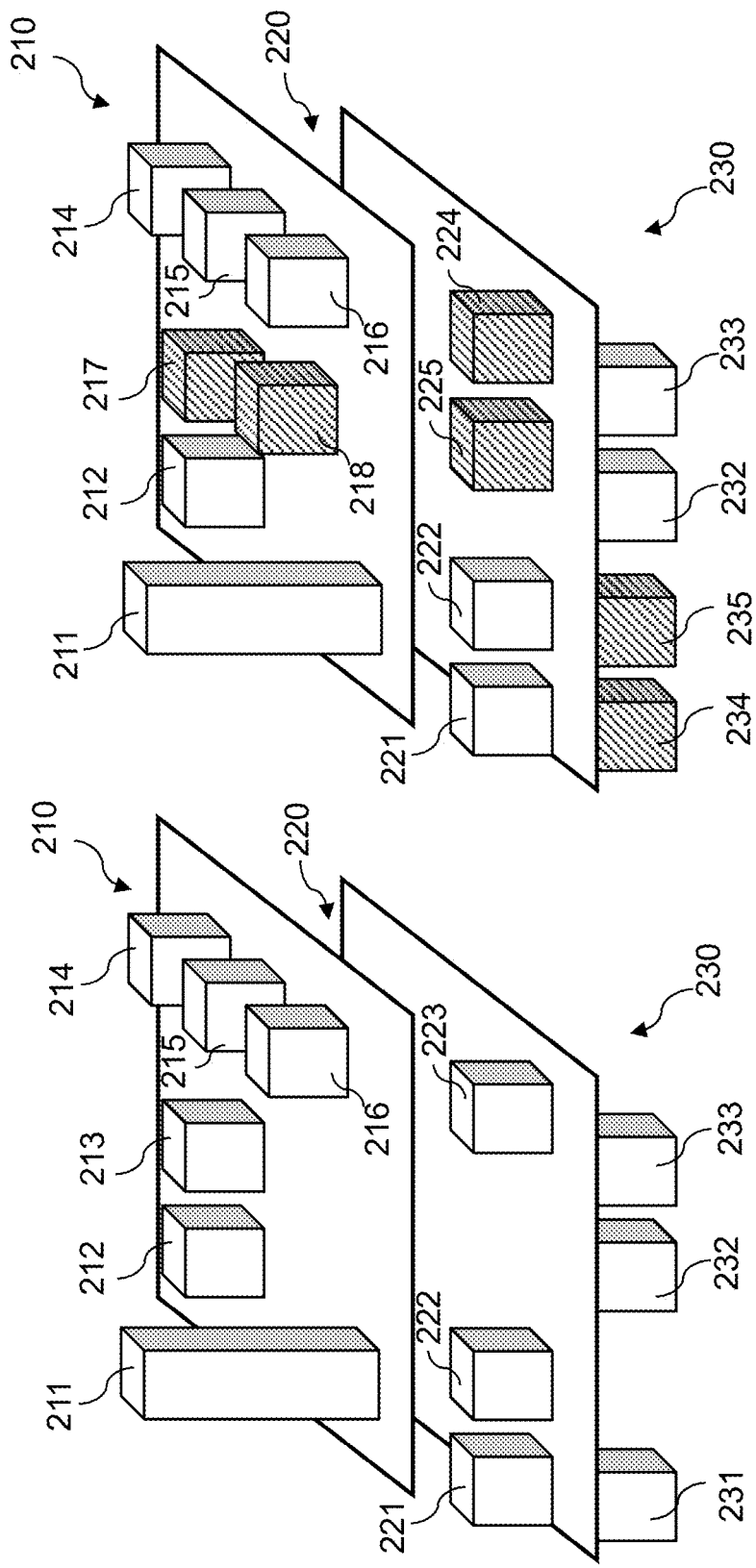
FIG. 2A and FIG. 2B are diagrams illustrating a real system view vs a system view from an untrusted process (or malware), in accordance with one embodiment of the present invention.

FIG. 2A and FIG. 2B are diagrams illustrating a real system view versus a system view from untrusted process (or malware) 211, in accordance with one embodiment of the present invention. FIG. 2A is a diagram illustrating the real system view. The real system view includes application layer 210, operating system layer 220, and hardware layer 230. Application layer 210 includes application resources 212 through 216. Application layer 210 also includes untrusted process (or malware) 211. Operating system layer 220 includes operating resources 221 through 223. Hardware layer 230 includes hardware resources 231 through 233.

FIG. 2B is a diagram illustrating a system view from untrusted process (or malware) 211. There are two ways to build scarecrow application resources (or imitating application resources) in application layer 210: (1) adding one or more real resources and (2) providing one or more victual resources or decorated resources. With a decorated resource, a value of an existing resource is modified.

Figure 3:
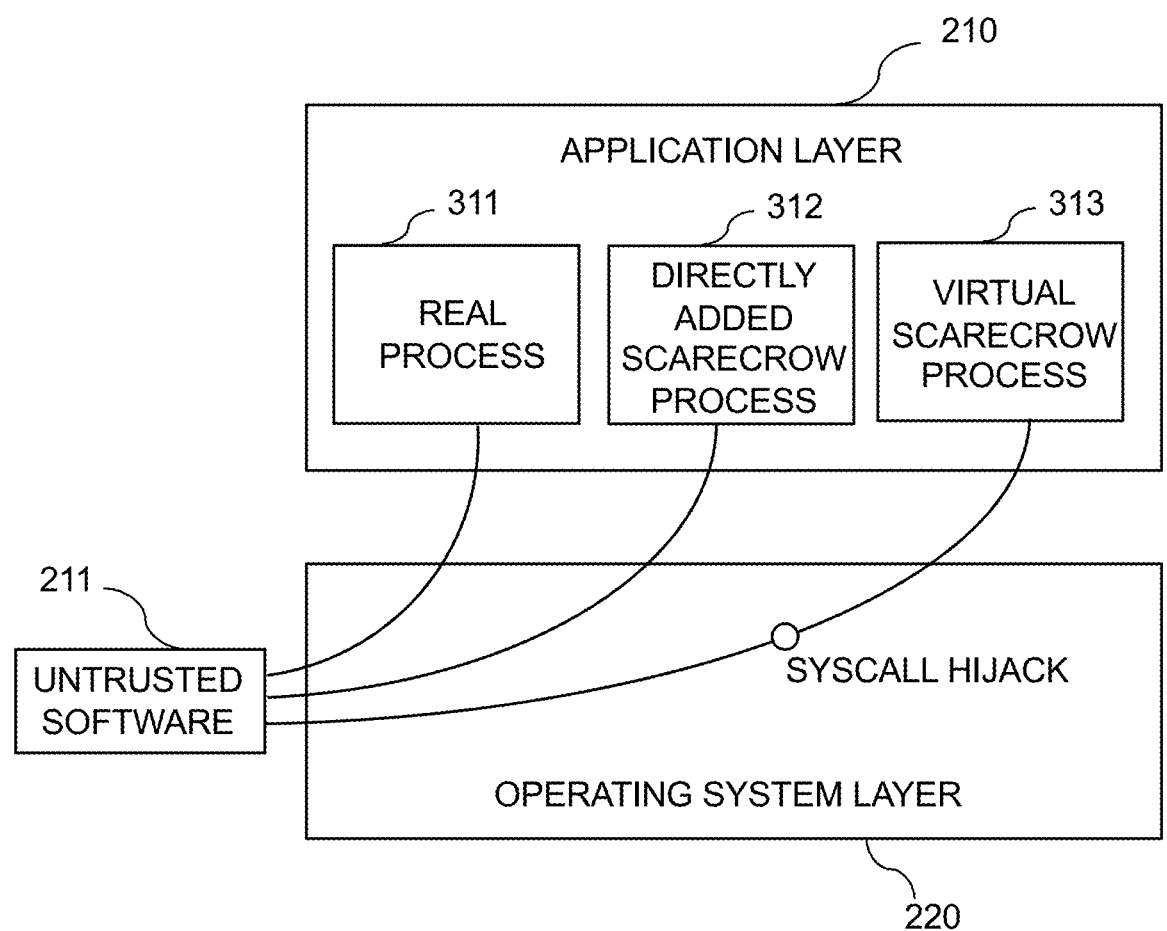
FIG. 3 is a diagram illustrating a scarecrow architecture in an application layer, in accordance with one embodiment of the present invention.

Referring to FIG. 2B, in application layer 210, scarecrow application resource 218 is added as a real scarecrow application resource; for example, application resource 218 is a scarecrow application resource (or imitating application resource) which can start a fake or imitating analysis process debug_process.exe in application layer 210 on a physical host (or computer device) to deceive untrusted process (or malware) 211 into believing that a sandbox analysis process is running. Application resource 218 causes untrusted process (or malware) 211 to respond to the imitating environment of the malware analysis as to a real environment of the malware analysis. Untrusted process (or malware) 211 determines that it is running on analysis environments and thus performs its benign behaviors or exits. In application layer 210, scarecrow application resource 217 is provided as a virtual application resource or decorated application resource. The operating system of the physical host intercepts system calls related to application resource 213 (shown in FIG. 2A) and returns crafted results (i.e., scarecrow application resource 217) to untrusted process (or malware) 211. For example, when untrusted process (or malware) 211 use Process32next( ) to enumerate current running processes, the operating system intercepts the system call and returns faked or imitated process list (e.g., debug_process.exe). FIG. 3 is a diagram illustrating a scarecrow architecture in application layer 210, in accordance with one embodiment of the present invention. Application layer 210 includes real process 311, directly added scarecrow process 312, and virtual scarecrow process 313. Directly added scarecrow process 312 deceives untrusted process (or malware) 211 into believing that a sandbox analysis process is running. Operating system layer 220 intercepts a system call from untrusted process (or malware) 211 and returns a faked or imitated process—virtual scarecrow process 313—back to untrusted process (or malware) 211.

Figure 4:
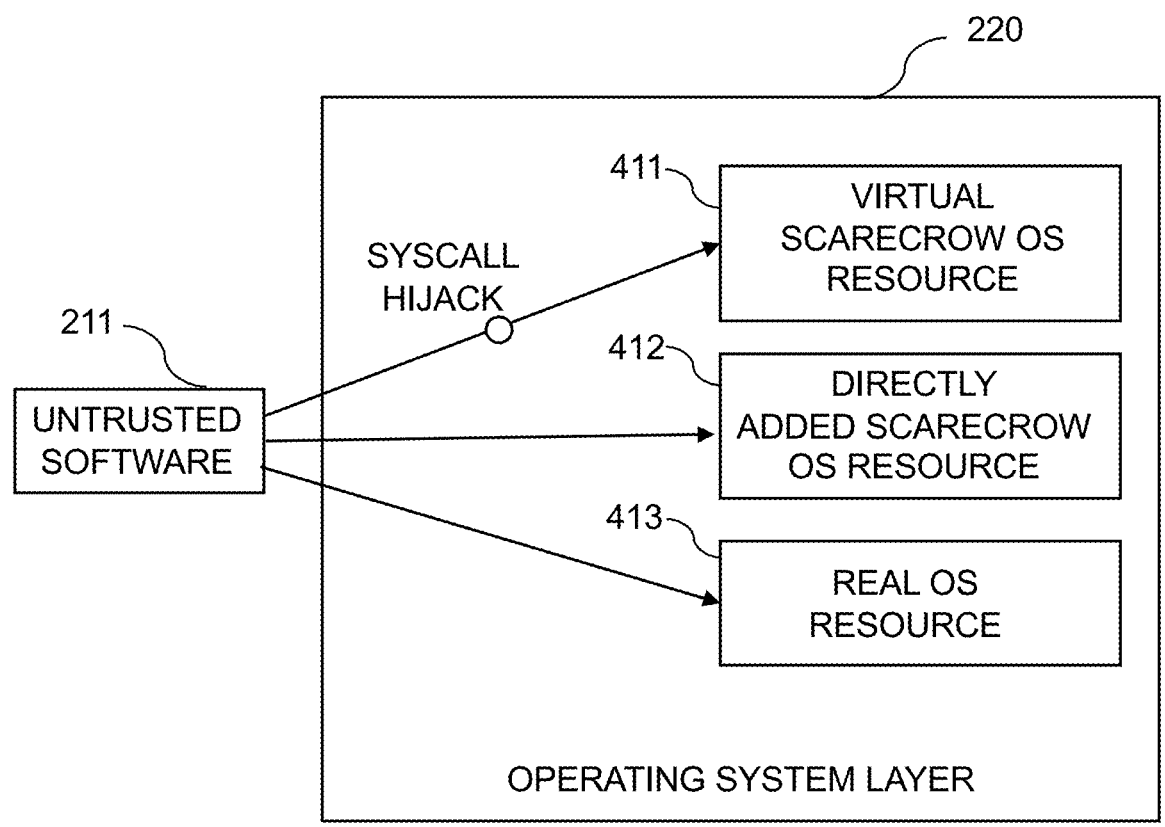
FIG. 4 is a diagram illustrating a scarecrow architecture in an operating system layer, in accordance with one embodiment of the present invention.

Referring to FIG. 2B, in operating system layer 220, scarecrow operating system resource 225 is added as a real scarecrow operating resource. For example, a fake or imitating driver VBoxMouse.sys, which is an indicator of a VirtualBox® environment, is directly created in operating system layer 220; the fake or imitating driver deceives untrusted process (or malware) 211 into believing that a sandbox analysis process is running. Scarecrow operating system resource 225 causes untrusted process (or malware) 211 to respond to the imitating environment of the malware analysis as to a real environment of the malware analysis. Untrusted process (or malware) 211 determines that it is running on analysis environments and thus performs its benign behaviors or exits. In operating system layer 220, scarecrow operating system resource 224 is provided as a virtual operating resource or a decorated operating resource. A call from untrusted process (or malware) 211 to operating resource 223 (Shown in FIG. 2A) (which is, for example, related to a system API) is intercepted by the operating system and the operating system returns crafted results (i.e., scarecrow operating system resource 224) to untrusted process (or malware) 211. FIG. 4 is a diagram illustrating a scarecrow architecture in operating system layer 220, in accordance with one embodiment of the present invention.

Operating system layer 220 includes real operating system resource 413, directly added scarecrow operating system resource 412, and virtual scarecrow operating system resource 411. Directly added scarecrow operating system resource 412 deceive untrusted process (or malware) 211 into believing that a sandbox analysis process is running. Operating system layer 220 intercepts a system call from untrusted process (or malware) 211 and returns a faked or imitated process—virtual scarecrow operating system resource 411—back to untrusted process (or malware) 211.

Figure 5:
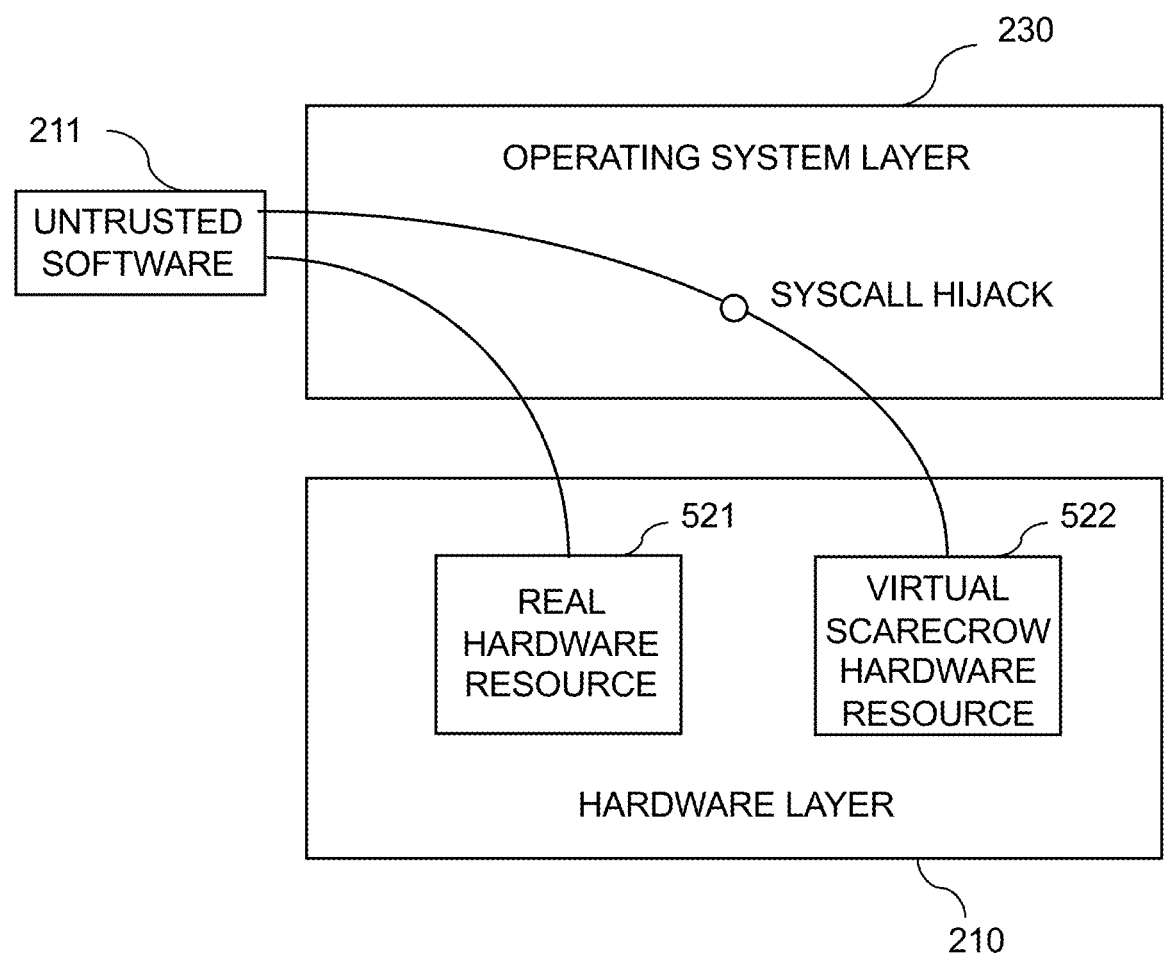
FIG. 5 is a diagram illustrating a scarecrow architecture in a hardware layer, in accordance with one embodiment of the present invention.

Referring to FIG. 2B, in hardware layer 230, kernel data that represents hardware resources to the user is modified, instead of directly adding real scarecrow hardware recourses. In hardware layer 230, virtual scarecrow hardware resources or decorated hardware resources are provided. In hardware layer 230, virtual scarecrow hardware resources 235 is also provided. Also, virtual scarecrow hardware resources 234 is provided; when untrusted process (or malware) 211 calls hardware resource 231 (shown in FIG. 2A), operating system layer 220 intercepts a corresponding system API and returns crafted results (i.e., scarecrow hardware resource 234 or scarecrow hardware resource 235) to untrusted process (or malware) 211. For example, when untrusted process (or malware) 211 checks whether a camera is installed on the physical host through a system call, operating system layer 220 intercepts the calls and return true to untrusted process (or malware) 211. As a result, untrusted process (or malware) 211 believes the camera is installed but actually no camera is installed on the physical host. FIG. 5 is a diagram illustrating a scarecrow architecture in hardware layer 230, in accordance with one embodiment of the present invention. Hardware layer 230 includes real hardware resource 521 and virtual scarecrow hardware resource 522. Operating system layer 230 intercepts a system call from untrusted process (or malware) 211 and returns a faked or imitated process—virtual scarecrow hardware resource 522—back to untrusted process (or malware) 211.

Figure 6:
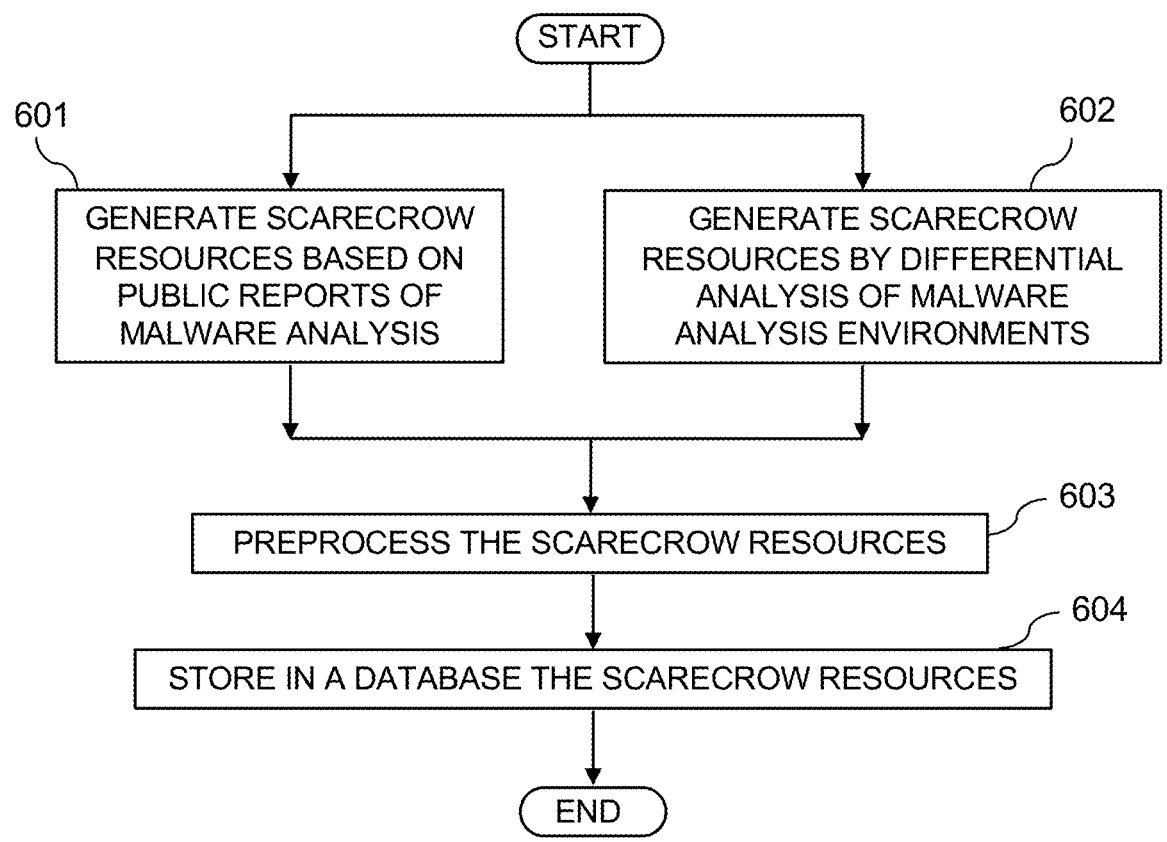
FIG. 6 is a flowchart showing operational steps for generating scarecrow resources deactivating evasive malware, in accordance with one embodiment of the present invention.

FIG. 6 is a flowchart showing operational steps for generating scarecrow resources deactivating evasive malware, in accordance with one embodiment of the present invention. The generating scarecrow resources deactivating evasive malware is implemented by a computer device or server. The computer device will be described in detail in later paragraphs of this document, with reference to FIG. 8. At step 601, the computer device or server generates scarecrow resources (or imitating resources) based on public reports of malware analysis. The scarecrow resources (or imitating resources) generated at step 601 include but not limited to folders, files, libraries, and registry entries. At step 602, the computer device or server generates scarecrow resources (or imitating resources) by differential analysis of different malware analysis environments. The scarecrow resources (or imitating resources) generated at step 602 include but not limited to system calls, APIs, and relationships of the calls. At step 603, the computer device or server preprocesses the scarecrow resources (or imitating resources) generated at step 601 and/or step 602. Preprocessing the scarecrow resources (or imitating resources) includes filtering duplicated resources, filtering resources with conflicts, and generating dependent relations of the resources. At step 604, the computer device or server stores in a database the scarecrow resources (or imitating resources) generated at step 601 and/or step 602. The database is used for deactivating evasive malware by scarecrow resources (or imitating resources) on a physical host, which will be discussed in later paragraphs of this document, with reference to FIG. 7.

The scarecrow resources (or imitating resources) generated at step 601 are static scarecrow resources whose values are deterministic (e.g., processes and files). Therefore, the scarecrow resources (or imitating resources) generated at step 601 are directly created or installed on physical hosts.

The scarecrow resources (or imitating resources) generated at step 602 are dynamic scarecrow resources whose values are dynamically changed in an operating system of a physical host. Therefore, the operating system intercepts the system calls or related APIs and returns virtual resources—the scarecrow resources (or imitating resources) generated at step 602.

Figure 7A:
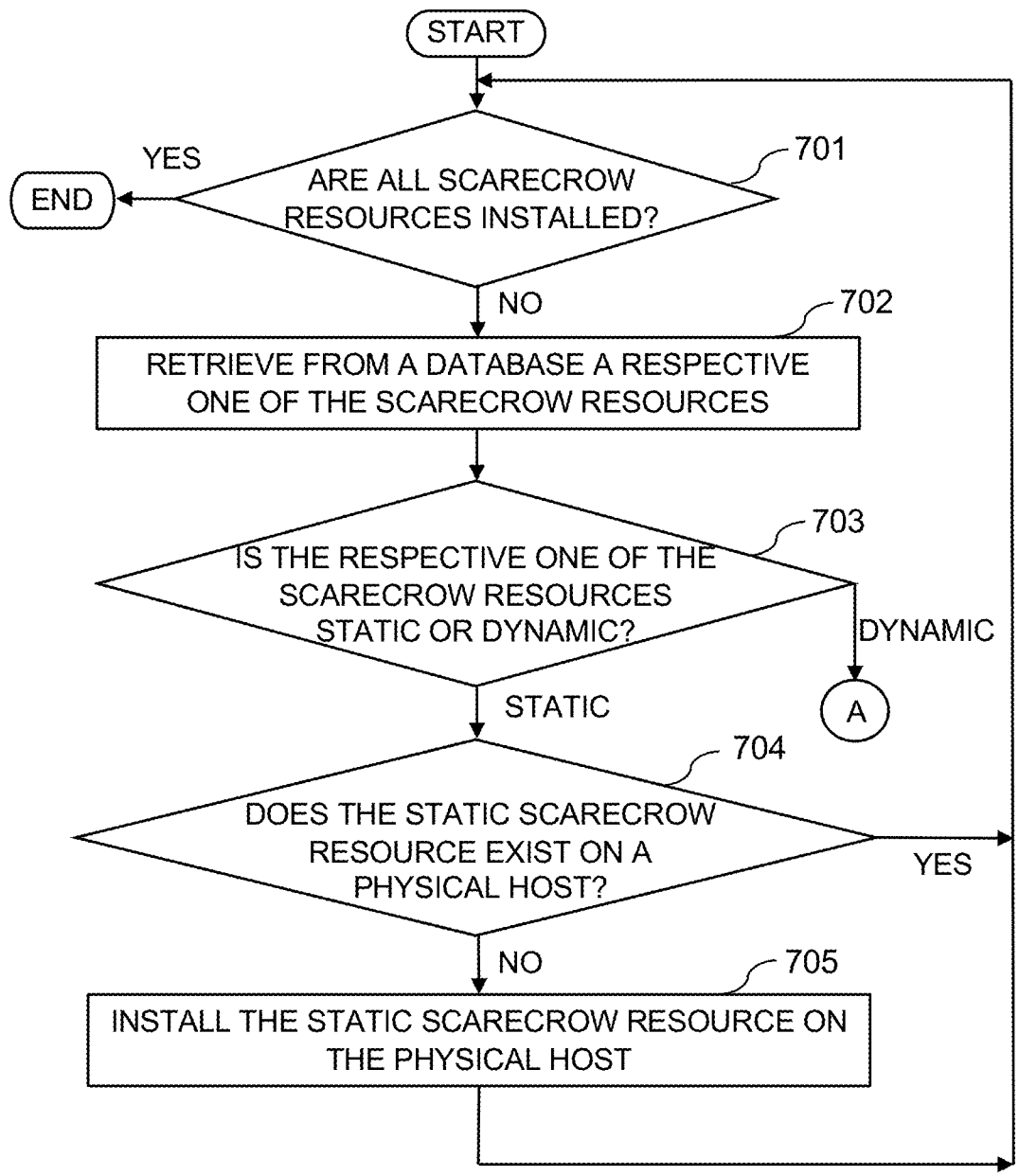
FIG. 7A and FIG. 7B include a flowchart showing operational steps for protecting a physical host from evasive malware, in accordance with one embodiment of the present invention.
Figure 7B:
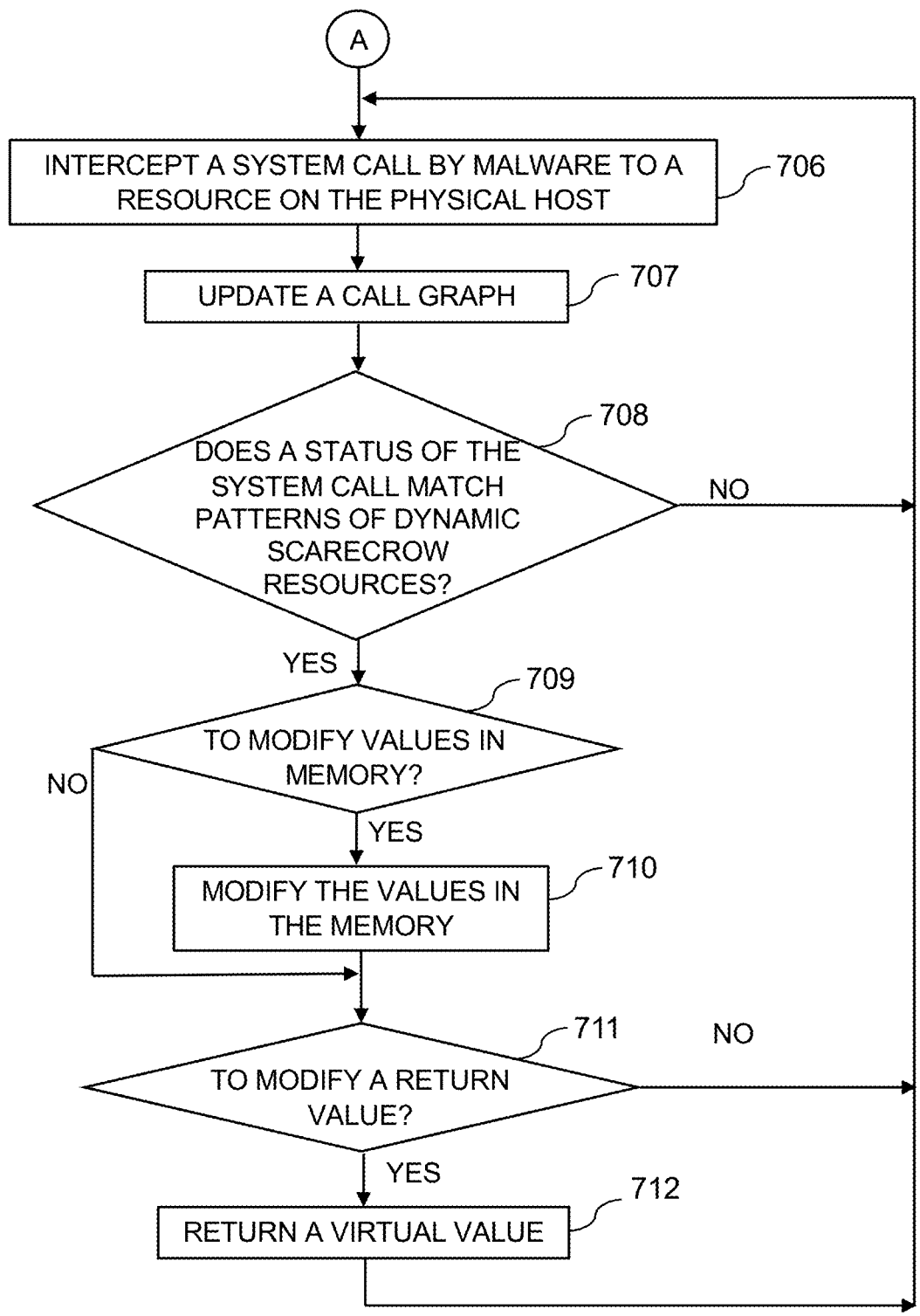

FIG. 7A and FIG. 7B include a flowchart showing operational steps for protecting a physical host from evasive malware, in accordance with one embodiment of the present invention. The steps 701-713 in FIG. 7A and FIG. 7B are implemented by a physical host which is a computer device to be protected by scarecrow resources (or imitating resources. The physical host will be described in detail in later paragraphs of this document, with reference to FIG. 8. At step 701, the physical host determines whether all scarecrow resources (or imitating resources) are installed on the physical host. In response to determining that all scarecrow resources (or imitating resources) are installed on the physical host (YES branch of step 701), the operational steps are terminated. In response to determining that no all scarecrow resources (or imitating resources) are installed on the physical host (NO branch of step 701), step 702 is executed. At step 702, the physical host retrieves from a database a respective one of the scarecrow resources (or imitating resources). The scarecrow resources (or imitating resources), which are generated at step 601 and/or step 602 shown in FIG. 6, are stored in the database. At step 703, the physical host determines whether the respective one of the scarecrow resources is a static scarecrow resource or a dynamic scarecrow resource.

In response to determining that the respective one of the scarecrow resources is a static scarecrow resource, the physical host at step 704 further determines whether the static scarecrow resource exists in the physical host. In response to determining that the static scarecrow resource does not exist in the physical host (NO branch of step 704), the physical host at step 705 installs the static scarecrow resource on the physical host. After step 705, the physical host reiterates step 701.

In response to determining that the static scarecrow resource exists on the physical host (YES branch of step 704), the physical host reiterates step 701.

In response to determining that the respective one of the scarecrow resources is a dynamic scarecrow resource, the physical host executes steps presented in FIG. 7B, as indicated by—in FIG. 7A and FIG. 7B. At step 706 (shown in FIG. 7B), the operating system of the physical host intercepts a system call by malware or an untrusted resource to a resource on the physical host. At step 707, the physical host updates a call graph on a database storing call graphs. The call graph database is a recording of the current running malware call behaviors. At step 708, the physical host determines whether a status of the system call matches patterns of dynamic scarecrow resources. The dynamic scarecrow resources are stored in a database. In one embodiment, both the dynamic scarecrow resources (dynamic imitating resources) and the static scarecrow resources (static imitating resources) are stored on the same database. In another embodiment, the dynamic scarecrow resources (dynamic imitating resources) are stored on one database while the static scarecrow resources (static imitating resources) are stored on another database. In response to determining that the status of the system call does not match patterns of dynamic scarecrow resources (NO branch of step 708), the physical host reiterates step 706.

In response to determining that the status of the system call matches patterns of dynamic scarecrow resources (YES branch of step 708), the physical host at step 709 determines whether to modify values in memory. In response to determining to modify the values in the memory (YES branch of step 709), the physical host at step 710 modifies the values in the memory.

In response to determining not to modify the values in the memory (NO branch of step 709), the physical host at step 710 determines whether to return a virtual value to the malware or the untrusted resource. In response to determining to return the virtual value to the malware or the untrusted resource (YES branch of step 711), the physical host at step 712 returns the virtual value to the malware or the untrusted resource. After step 712, the physical host reiterates step 706. In response to determining not to return the virtual value to the malware or the untrusted resource (NO branch of step 711), the physical host reiterates step 706.

Figure 8:
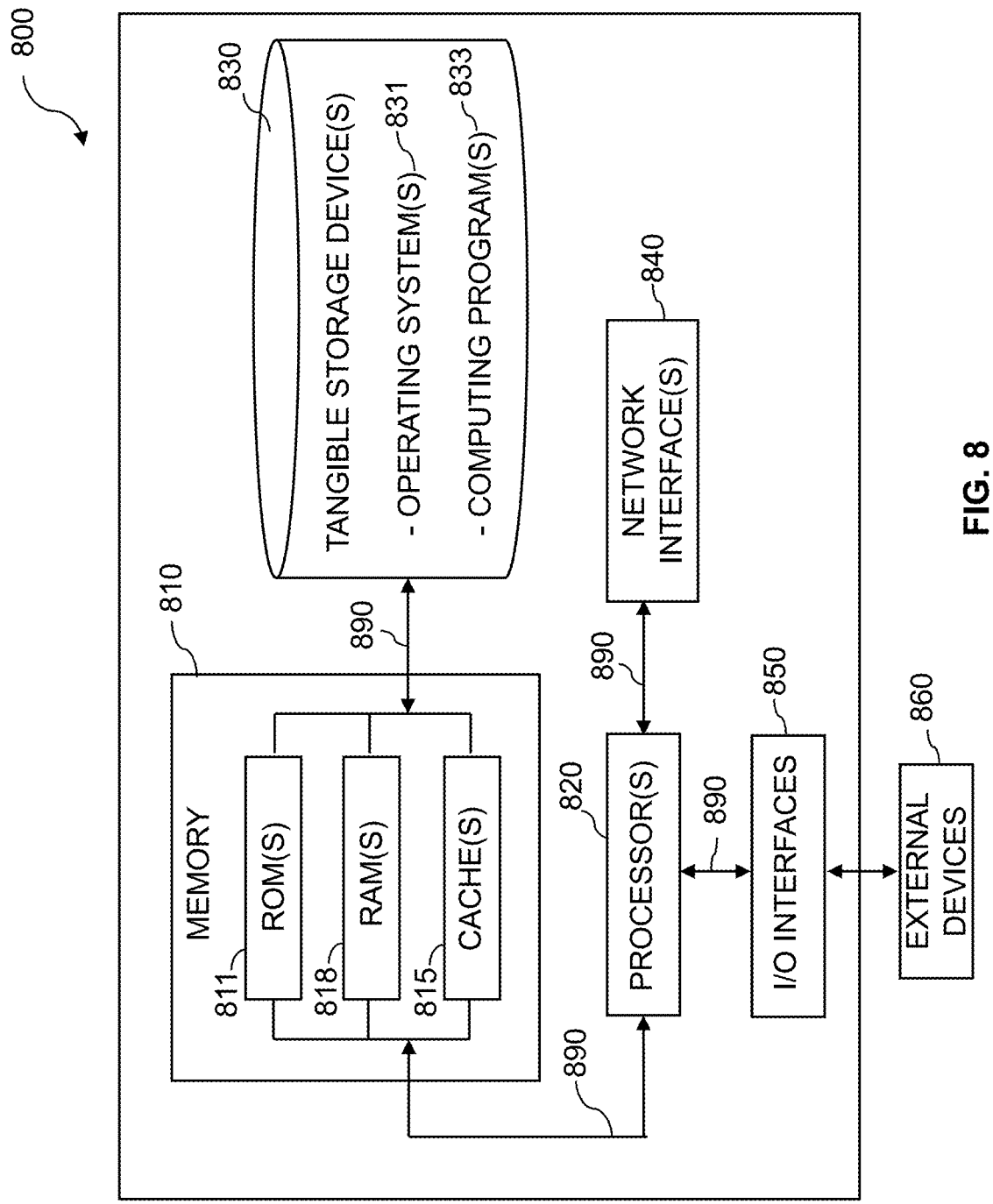
FIG. 8 is a diagram illustrating components of a computer device for generating scarecrow resources deactivating evasive malware or a computer device protected by scarecrow resources, in accordance with one embodiment of the present invention.

FIG. 8 is a diagram illustrating components of computer device 800 for generating for generating scarecrow resources deactivating evasive malware or computer device 800 protected by scarecrow resources, in accordance with one embodiment of the present invention. It should be appreciated that FIG. 8 provides only an illustration of one implementation and does not imply any limitations with regard to the environment in which different embodiments may be implemented. The computer device may be any electronic device or computing system capable of receiving input from a user, executing computer program instructions, and communicating with another electronic device or computing system via a network.

Referring to FIG. 8, device 800 includes processor(s) 820, memory 810, and tangible storage device(s) 830. In FIG. 8, communications among the above-mentioned components of device 800 are denoted by numeral 890. Memory 810 includes ROM(s) (Read Only Memory) 811, RAM(s) (Random Access Memory) 813, and cache(s) 815. One or more operating systems 831 and one or more computer programs 833 reside on one or more computer readable tangible storage device(s) 830. On a computer device for generating scarecrow resources deactivating evasive malware, one or more computer programs 833 include one or more program for generating scarecrow resources. On a computer device to be protected by scarecrow resources, one or more computer programs 833 include one or more program for protecting the physical host by scarecrow resources from evasive malware. Device 800 further includes I/O interface(s) 850. I/O interface(s) 850 allows for input and output of data with external device(s) 860 that may be connected to device 800. Device 800 further includes network interface(s) 840 for communications between device 800 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the C programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for protecting a host from evasive malware, the computer-implemented method comprising:
    installing and configuring, by a computer system, a virtual imitating resource in the computer system, the virtual imitating resource imitating a set of resources in the computer system, wherein installing and configuring the virtual imitating resource includes modifying respective values of an installed version of the virtual imitating resource for an environment of the computer system, wherein installing and configuring the virtual imitating resource further includes determining whether the virtual imitating resource is a static imitating resource or a dynamic imitating resource, wherein installing and configuring the virtual imitating resource further includes, in response to determining that the virtual imitating resource is the dynamic imitating resource, comparing a call graph of the evasive malware with patterns of dynamic imitating resources on a database;
    in response to a call from the evasive malware to a real computing resource, returning, by the computer system, a response from an appropriate element of the virtual imitating resource.

2. The computer-implemented method of claim 1, further comprising:
    installing, by the computer system, the virtual imitating resource in an application layer of the computer system to imitate a real application resource in the application layer.

3. The computer-implemented method of claim 1, further comprising:
    installing, by the computer system, the virtual imitating resource in an operating system layer of the computer system to imitate a real operating system resource in the operating system layer.

4. The computer-implemented method of claim 1, further comprising:
    installing, by the computer system, the virtual imitating resource in a hardware layer of the computer system to imitate a real hardware resource in the hardware layer.

5. The computer-implemented method of claim 1, wherein the virtual imitating resource is generated by a server, based on public reports of malware analysis, wherein the virtual imitating resource is stored by the server in a database storing imitating resources.

6. The computer-implemented method of claim 5, wherein the virtual imitating resource is retrieved by the computer system from the database storing imitating resources.

7. The computer-implemented method of claim 1, wherein the virtual imitating resource is one of static resources whose values are deterministic, wherein the static resources are at least one of processes and files.

8. A computer program product for protecting a host from evasive malware, the computer program product comprising one or more computer-readable tangible storage devices and program instructions stored on at least one of the one or more computer-readable tangible storage devices, the program instructions executable to:
    install and configure, by a computer system, a virtual imitating resource in the computer system, the virtual imitating resource imitating a set of resources in the computer system, wherein installing and configuring the virtual imitating resource includes modifying respective values of an installed version of the virtual imitating resource for an environment of the computer system, wherein installing and configuring the virtual imitating resource further includes determining whether the virtual imitating resource is a static imitating resource or a dynamic imitating resource, wherein installing and configuring the virtual imitating resource further includes, in response to determining that the virtual imitating resource is the dynamic imitating resource, comparing a call graph of the evasive malware with patterns of dynamic imitating resources on a database;
    in response to a call from the evasive malware to a real computing resource, return, by the computer system, a response from an appropriate element of the virtual imitating resource.

9. The computer program product of claim 8, further comprising the program instructions executable to:
   install, by the computer system, the virtual imitating resource in an application layer of the computer system to imitate a real application resource in the application layer.

10. The computer program product of claim 8, further comprising the program instructions executable to:
    install, by the computer system, the virtual imitating resource in an operating system layer of the computer system to imitate a real operating system resource in the operating system layer.

11. The computer program product of claim 8, further comprising the program instructions executable to:
    install, by the computer system, the virtual imitating resource in a hardware layer of the computer system to imitate a real hardware resource in the hardware layer.

12. The computer program product of claim 8, wherein the virtual imitating resource is generated by a server, based on public reports of malware analysis, wherein the virtual imitating resource is stored by the server in a database storing imitating resources.

13. The computer program product of claim 12, wherein the virtual imitating resource is retrieved by the computer system from the database storing imitating resources.

14. The computer program product of claim 8, wherein the virtual imitating resource is one of static resources whose values are deterministic, wherein the static resources are at least one of processes and files.

15. A computer system for deactivating evasive malware, the computer system comprising:
    one or more processors, one or more computer readable tangible storage devices, and program instructions stored on at least one of the one or more computer readable tangible storage devices for execution by at least one of the one or more processors, the program instructions executable to:
    install and configure, by the computer system, a virtual imitating resource in the computer system, the virtual imitating resource imitating a set of resources in the computer system, wherein installing and configuring the virtual imitating resource includes modifying respective values of an installed version of the virtual imitating resource for an environment of the computer system, wherein installing and configuring the virtual imitating resource further includes determining whether the virtual imitating resource is a static imitating resource or a dynamic imitating resource, wherein installing and configuring the virtual imitating resource further includes, in response to determining that the virtual imitating resource is the dynamic imitating resource, comparing a call graph of the evasive malware with patterns of dynamic imitating resources on a database;
    in response to a call from the evasive malware to a real computing resource, return, by the computer system, a response from an appropriate element of the virtual imitating resource.

16. The computer system of claim 15, further comprising the program instructions executable to:
    install, by the computer system, the virtual imitating resource in an application layer of the computer system to imitate a real application resource in the application layer.

17. The computer system of claim 15, further comprising the program instructions executable to:
    install, by the computer system, the virtual imitating resource in an operating system layer of the computer system to imitate a real operating system resource in the operating system layer.

18. The computer system of claim 15, further comprising the program instructions executable to:
    install, by the computer system, the virtual imitating resource in a hardware layer of the computer system to imitate a real hardware resource in the hardware layer.

19. The computer system of claim 15, wherein the virtual imitating resource is generated by a server, based on public reports of malware analysis, wherein the virtual imitating resource is stored by the server in a database storing imitating resources, wherein the virtual imitating resource is retrieved by the computer system from the database storing imitating resources.

20. The computer system of claim 15, wherein the virtual imitating resource is one of static resources whose values are deterministic, wherein the static resources are at least one of processes and files.

* * * * *